United States Patent [19] [11] 3,804,650
Meissner et al. [45] Apr. 16, 1974

[54] SILICATE BINDERS

[75] Inventors: Helmuth E. Meissner, Painted Post; Francis L. Orso, Corning; Timothy E. Pierce, Pine City; Janice L. Stiles, Painted Post, all of N.Y.

[73] Assignee: Corning Glass Works, Corning, N.Y.

[22] Filed: Feb. 22, 1972

[21] Appl. No.: 228,297

Related U.S. Application Data

[63] Continuation of Ser. No. 45,908, June 12, 1970, abandoned.

[52] U.S. Cl. .................................. 106/84, 264/42
[51] Int. Cl.. C04b 35/72, C04b 35/14, C04b 35/16
[58] Field of Search .............. 106/38.35, 40, 41, 52, 106/54, 69, 74, 84; 264/42, 63

[56] References Cited
UNITED STATES PATENTS

| | | | |
|---|---|---|---|
| 3,028,340 | 4/1962 | Gandon et al. | 106/38.35 X |
| 3,306,756 | 2/1967 | Miller | 106/74 |
| 2,919,996 | 1/1960 | Teja | 106/74 |
| 2,818,619 | 1/1958 | Bradley et al. | 106/38.35 X |
| 2,851,752 | 9/1958 | Benham | 106/38.35 X |
| 2,968,572 | 1/1961 | Peeler, Jr. | 106/74 |
| 3,436,236 | 4/1969 | Gamber et al. | 106/69 X |
| 3,432,312 | 3/1969 | Feagin et al. | 106/38.35 X |

Primary Examiner—Donald E. Czaja
Assistant Examiner—Gary R. Marshall
Attorney, Agent, or Firm—Clinton S. Janes, Jr.

[57] ABSTRACT

This invention relates to the manufacture of silica-containing bonding materials capable of imparting improved green-body strength to ceramic articles such as refractory bodies which are to be subsequently sintered and to composite bodies made from such materials as asbestos, fiber glass, sawdust, and wood shavings. More specifically, this invention is founded primarily upon the discovery that when certain organic compounds and/or MgO treated in a particular manner are added to true solutions, colloidal solutions, or suspensions of silicates containing at least 1 mole of silica per liter in solution and/or colloidal solution and having a pH greater than about 10, a reaction will occur reducing the pH and polymerizing the silica. The resulting silica network structure bonds very strongly to inert or essentially inert filler materials, forming bodies having uniquely desirable characteristics.

6 Claims, No Drawings

SILICATE BINDERS

This is a continuation of application Ser. No. 45,908, filed June 12, 1970, now abandoned.

BACKGROUND OF THE INVENTION

Aqueous silicate solutions and colloidal solutions normally having a pH greater than about 10 are well-known to the art. Such solutions include lithium silicate, sodium silicate, potassium silicate, organic ammonium silicate (commonly quaternary ammonium silicate), and colloidal silica. The amount of silica in solution is dependent upon the individual silicate. That the polymerization of the silica in such solution can be accomplished through the reduction of the pH of the solution has previously been utilized in the commercial production of silica gel. When dried, particulate and mechanically weak materials known as xero-gels are formed.

Copending U.S. Pat. application Ser. No. 45,806, filed of even date with Ser. No. 45,908 by J. E. Pierson and S. D. Stookey discloses a process for forming self-supporting, porous, silica-containing bodies from such soluble silicate solutions through the utilization of formamide, formaldehyde, paraformaldehyde, and glyoxal as gelation agents. In that process, true solutions, colloidal solutions, or suspensions of the above-mentioned soluble silicates, containing silica in concentrations greater than about 1 mole/liter in solution, are combined with the gelation agents which react relatively uniformly throughout the solution to neutralize the alkali and/or ammonium ion present and, consequently, polymerize the silica. As is explained therein, it is customarily desirable to have as much silica as possible in solution so whereas a minimum of about 1 mole per liter of silica can produce a useable product, 3 moles per liter of silica in solution is a preferred minimum. Concentrations of silica greater than about 12 moles per liter in solution are very difficult to achieve, so this concentration constitutes a very practical maximum. The amount of alkali and/or ammonium ion must be sufficient to yield a pH greater than about 10 with a pH of 15 being a preferred maximum.

The reaction between the organic gelation agents and the silicate solutions, colloidal solutions, and suspensions is initiated by exposing mixtures thereof at moderately low temperatures, i.e., in the range between the boiling point and freezing point of the solution, with higher temperatures being operable at elevated pressures. Commonly, reaction temperatures between about 40°–100°C. for times ranging between about 5 seconds to 24 hours are employed. Reaction or "curing" times of up to 720 hours can be utilized but with no essential improvement in properties over such achieved in shorter reaction times. In general, the concomitant neutralization reduces the pH of the solution from over 10 to the range of about 7–9. The reaction, itself, can be likened to a phase separation in that the gelation agent reacts with the alkali and/or ammonium ion to yield a less basic solution wherein the silica can polymerize.

Following the reaction, the products formed are washed in water, acids, or other suitable solvents. Where the product contains a water soluble phase, this material can be leached out leaving a self-supporting, porous, silica body. Copending U.S. Pat. application Ser. No. 45,905, now abandoned but re-filed as continuation application Ser. No. 228,298, on Feb. 22, 1972 filed concurrently with Ser. No. 45,908 by F. L. Orso and T. E. Pierce, discloses that the reacted body, i.e., the unleached body, can be fired in a particular manner to consolidate the reacted body into a solid glass article with essentially the same body geometry.

Copending U.S. Pat. application Serial No. 45,907, now abandoned but re-filed as continuation application Ser. No. 228,299, on Feb. 22, 1972 filed concurrently with Serial No. 45,908 in the names of H. E. Meissner and S. D. Stookey, teaches that the porous glass bodies and solid glass bodies disclosed by Pierson and Stookey and Orso and Pierce can also be produced employing certain esters or inorganic salts which, in hydrolyzing, form weak acids as the gelation agents.

SUMMARY OF THE INVENTION

The use of silicate solutions, colloidal solutions, and suspensions as bonds in various ceramic products such as refractory shapes and in the formation of composite articles of such inert materials as asbestos, wood fibers, SiC fibers, $Al_2O_3$ fibers, carbon fibers, sawdust, etc. is well-known in the art. The bonding therein conventionally relies upon the polymerization of the silica or silicates induced by acidification or simple dehydration in drying. Such practice does not yield a coherent structure and, therefore, the strength of the thus-formed body is not as great as would be desirable.

This situation is particularly disturbing where colloidal silica is employed as the bonding medium. Nevertheless, whereas the alkali silicates normally provide somewhat stronger bonds, they are quite undesirable as binders for high temperature refractory materials inasmuch as they form low melting glassy phases between the refractory grains and lead to failure through corrosive attack and/or thermal slumping.

Likewise, although fiber composites bonded through the simple drying of alkali silicate solutions possess a fair amount of mechanical strength, such bodies are prone to water damage resulting from the leaching of the silicates therefrom. However, the use of silicates as binders for wood composites renders such bodies more fire resistant and have an additional advantage over organic fire resistant binders in that toxic vapors are not released when exposed to heat.

Finally, gelation of soluble silica or silicates by acidification produces a body possessing a fragile structure resulting from the sudden precipitation of silica and the intrinsically lesser degree of polymerization in an acidic medium when compared with that occurring under neutral or slightly alkaline conditions.

We have now discovered that the green-body strength and water resistance of materials bonded with silicates or essentially alkali-free colloidal silica can be substantially improved by producing a uniform polymerization of silica throughout the formed body. The process requires the preparation of true solutions, colloidal solutions, and/or suspensions of silicates and certain defined organic gelation agents. These true and/or colloidal solutions and/or suspensions must contain at least 1 mole per liter and, preferably, 3–12 moles per liter of silica in solution or in colloidal solution. Inasmuch as silica itself is essentially insoluble in water, the silica is normally added in the form of a soluble silicate which is commonly an inorganic alkali metal silicate, an organic ammonium silicate, preferably a quaternary ammonium silicate, or in the form of a stabilized silica sol. In order to retain the silica in solution, the concentration of the alkali metal and/or ammonium ion must be adequate to yield a solution exhibiting a pH of about 10–15. To the soluble silicate or colloidal solution is added at least one gelation agent selected from the group consisting of formaldehyde, formamide, paraformaldehyde, glyoxal, methyl formate, methyl acetate, ethyl formate, and ethyl acetate which is uniformly dispersed or dissolved throughout the solution to react relatively slowly and uniformly to neutralize the alkali and/or ammonium ion present and, thereby, cause the polymerization of a silica network. Such polymerization achieves an essentially continuous three-dimensional network of siloxane chains. This coherency of structure is attained through the slow in situ release of an acid and/or a dehydrating agent which then causes polymerization of a soluble silica species. The very high degree of polymerization is reflected in the superior green-body strength of such-bonded materials when compared with similar materials conventionally bonded with soluble silicate solutions, colloidal silica, or silica suspensions. Finally, the polymerized or reacted silicate can thereafter be fired to the sintering temperature of the particular components to produce a solid structure.

As a second embodiment of our invention, we have discovered that where the refractory oxide, MgO, is employed as the filler material, it can be treated in such a manner as to render it capable of acting as a suitable gelation agent for the products of the invention. Thus, whereas the addition of MgO by itself to the silicate solutions, colloidal solutions, and suspensions will cause essentially instantaneous gelation of the silica, we have found that the chemical reactivity of the MgO can be sufficiently diluted by sintering or fusing it with a relatively inert material such that the MgO will gradually and uniformly cause gelation of the silica. In this manner, then, MgO can be utilized as a substitute for the organic gelation agents, either partially or completely, to create a uniformly polymerized silica network as a bonding medium.

DESCRIPTION OF THE PREFERRED EMBODIMENT

We have discovered that the compounds found suitable for gelation of the silicate solutions by Pierson and Stookey in copending U.S. Pat. application Ser. No. 45,806, and the esters likewise found suitable for gelation of the soluble silicate solutions by Meissner and Stookey in copending U.S. Pat. application Ser. No. 45,907, now abandoned but refiled as continuation application Ser. No. 228,299 on Feb. 22, 1972 are also effective in the amounts disclosed therein in our invention.

Pierson and Stookey describe the utility of formaldehyde, paraformaldehyde, glyoxal, and formamide in reducing the pH of the silicate solutions. The concentrations of those gelation agents are related to the alkali and/or ammonium ion present in the solution and, except for formamide, the mole ratio of the organic compound-to-alkali oxide and/or ammonium ion should lie between about 2–13. Formamide is more reactive than the other organic compounds and, therefore, is functionally equivalent in molar concentrations about one-third that of the other three. Hence, the effective mole ratios of formamide-to-alkali oxide and/or ammonium ion range between about 0.67–13.

Meissner and Stookey disclose the effectiveness of methyl formate, methyl acetate, ethyl formate, and ethyl acetate in concentrations between about 2–20 percent by volume as gelation agents for silica solutions. The reaction of ethyl acetate is quite slow so we prefer employing at least one of the other three esters. When these esters hydrolyze, the pH of the solution is reduced and silica polymerizes with a coherent network structure.

Any silicate solution or colloidal suspension can be utilized in this invention. Thus, a true or colloidal solution of a powdered silicate glass is operable in the invention but, in the interest of economy, we prefer to use commercially-marketed products. It is apparent that these solutions can be mixed together to achieve various concentrations of silica in solution provided, of course, the other solution limitations are observed. Commercially available lithium silicate is a colloidal solution whereas the sodium, potassium, and quaternary ammonium silicates are true solutions.

In preparing the solutions for the invention, formamide, methyl formate, methyl acetate, ethyl formate, ethyl acetate, were added as liquids; paraformaldehyde was included in particulate form; and the commercially marketed soluble silicates, colloidal silica, formaldehyde, and glyoxal solutions used are set forth below in weight percent:

Lithium polysilicate — 2.1% $Li_2O$, 20% $SiO_2$, balance $H_2O$

Sodium silicate — 6.75% $Na_2O$, 25.3% $SiO_2$, balance $H_2O$

Potassium silicate — 8.3% $K_2O$, 20.8% $SiO_2$, balance $H_2O$

Quaternary ammonium silicate — 9.85% ammonium ion, 45% $SiO_2$, balance $H_2O$

Colloidal silica — 40.2% $SiO_2$, 0.4% $Na_2O$, balance $H_2O$

Colloidal silica — 30% $SiO_2$, balance $H_2O$

Formaldehyde — 37% formaldehyde, 63% $H_2O$

Glyoxal — 30% glyoxal, 70% $H_2O$

The basic procedure for utilizing the binders of this invention in manufacturing sintered ceramic articles or composite bodies involves thoroughly mixing the silicate solution with a gelation agent and the material to be bonded, forming the mixture into a desired shape by casting, extruding, pressing, etc. curing the silicate binder, and then firing, where required, to yield the final product.

In general, where the material to be bonded is particulate, e.g., refractory oxides, SiC, carbon, $B_4C$, etc., the particles are preferably finer than about 270 Tyler mesh (>53 microns), if the viscosity of the suspension is not high enough to prevent settling out before gelation occurs. If a bonded material of very high density is sought, conventionally known methods of batch material sizing and additions of mineralizers are equally applicable in this invention. Moreover, the instant invention also permits the production of high porosity bodies, which, generally having open pores, recommends their utility for such applications as diffusion processes and pollution control.

The quantity of silicate or colloidal silica solution required to completely wet and bond a particular filler material is mainly dependent upon the density and surface area of the filler material. Thus, where refractory oxides are to be employed, the weight percentage of the total solution commonly varies between about 3–35 percent. In such practice, $SiO_2$ will normally be introduced as a binder in amounts ranging between about 1–25 percent by weight with respect to the total solids but it will be appreciated that, where greater amounts of $SiO_2$ are desired in the final product, additions of more than 25 percent by weight can advantageously be included. These amounts will also be dependent upon the concentration and kind of soluble silca or silicate. As opposed to this, however, the bonding of fibrous and/or porous materials, such as asbestos or wood, normally requires higher percentages of the liquid components to insure complete wetting. In general, amounts varying between about 40–75 percent will be necessary, the specific quantity depending principally upon the material to be bonded and upon the pressure which is applied during forming.

The concentrations of gelation agents will preferably vary between about 2–6 percent by volume of the silicate solution in the case of the esters, about 9–15 percent by weight of the silicate solution in the case of formaldehyde, paraformaldehyde, and glyoxal, and about 6–15 percent of the silicate solution where formamide is used.

After mixing the silicate solution with the gelation agent and the material to be bonded and this mixture then formed into a desired shape, the gelation agent will react with the silicate solution to provide good green strength to the thus-formed body. The reaction conditions, including time and temperature, are similar to those disclosed in the aforementioned copending applications. Thus, reaction temperatures between the freezing point and the boiling point of the solutions are operable with even higher temperatures being applicable where the reaction is carried out at elevated pressures. Commonly, the reactions are undertaken at atmospheric pressure employing temperatures ranging between room temperature and 100° C. for times varying between about 1–60 minutes. Curing periods of 24 hours and even up to 720 hours have been demonstrated to be useful but with no significant improvement in characteristics when compared with bodies produced within the preferred reaction times. Obviously, very brief reaction times at room temperature are impractical since gelling will occur before homogeneous mixing can be accomplished. The setting time to secure a strong gel can be controlled quite critically by varying the curing temperature and the gelation agent employed.

Following the curing or polymerization step, the body is dried and then heated to sintering temperatures when such is required. The drying step may be carried out at room temperatures but, normally, to shorten the time necessary to remove moisture, the body is heated to temperatures below about 100°C. for a period of time. To volatilize any organic material and ammonia, if present from the quaternary ammonia ion or if added to raise the pH of the colloidal silica solution and thereby expedite the gelation reaction, the body is slowly heated to a temperature below the softening point of the silicate glass and held thereat for a period of time. Thereafter, the temperature of the body is raised to that required for sintering, commonly between about 1,000°–1,700°C. Although the drying, volatizing, and sintering operations have been phrased as three distinct steps, it can be readily appreciated that various modifications thereof are possible. For example, an essentially constant rate, slow heating schedule could be developed to first dry the gel, then volatilize out organic matter and ammonia, and, finally, sinter the body. In carrying out the sintering, the rate of heating the cured body to the required firing temperature is governed only by the need to avoid bubbling and cracking.

The range of filler materials which can be integrally bonded by this method is quite broad, being limited only by the compatibility and wettability of the different materials with the silica-containing solutions and gelation agents as well as a relative chemical inertness thereto. Hence, the invention is applicable to such compounds as oxides (e.g., $TiO_2$, $ZrO_2$, $Al_2O_3$, $SiO_2$, $Cr_2O_3$, $ThO_2$, and $V_2O_5$), carbides (e.g., SiC, TiC, ZrC, $B_4C$, WC, and MoC), borides (e.g., $TiB_2$, $WB_2$, $MoB_2$, $ZrB_2$, and $AlB_2$), silicides (e.g., $MoSi_2$, $WSi_2$, and $ZrSi_2$), and nitrides (e.g., AlN, BN, $Si_3N_4$, TiN, $WN_2$, and ZrN); inorganic and organic fillers (e.g., asbestos, glass, and cellulose); inert solid elements (e.g., graphite, nickel, chromium, tungsten, and molybdenum); alloys (e.g., stainless steels); organic polymers (e.g., nylon, dacron, and rayon); and mixtures of these materials.

The useful range of silica sources extends over all solutions capable of polymerizing in the course of the gelation reaction. For compositions to be employed in high temperature applications, essentially alkali-free aqueous colloidal silica solutions are the preferred species for binders.

The following examples are presented to better facilitate an understanding of the invention and should be considered as illustrative of the invention only and not limiting thereof.

EXAMPLE I

A suspension composed of 1,000 cc. of the above-described colloidal silica solution containing 30% $SiO_2$, 4,000 grams of $Al_2O_3$ having a particle size less than 43 microns, and 100 cc. $NH_4OH$ was stirred vigorously for about 1 hour at room temperature to secure homogeneous mixing and wetting. Thereafter, 40 cc. of methyl formate were run into the slurry, the combined mixture strongly agitated for about 2 minutes, and then transferred to a plastic mould. Trapped air bubbles were released to the surface by tapping and vibrating the mould. Gelation began in about 3 minutes and linear shrinkage of approximately 3 percent occurred within about 60 minutes. The mould containing the gel was exposed to the ambient atmosphere for 4 days, care being taken to repeatedly change the base surface during this period to facilitate even shrinkage without cracking. Finally, the mould was placed in an oven operating at 60°–70°C. for about 40 hours. The total shrinkage during drying was about 8 percent linearly. Upon removal from the plastic mould, this "green" material demonstrated a modulus of rupture of about 234 psi.

The air dried body was then placed on a refractory brick covered with coarse calcined $Al_2O_3$ to allow the body to move during shrinkage. The refractory brick holding the desired body was transferred to an electrically fired kiln, heated to 1,500°C. at about 100°C./hour, held thereat for four hours, and thereafter cooled to room temperature by merely cutting off the electric power to the kiln and allowing the kiln to cool at its own rate with the sample retained therein. This mode of cooling, denoted "furnace rate," was estimated to average about 3°C./minute. The overall shrinkage of the fired body was measured as about 11 percent.

The fired body, consisting of about 92% $Al_2O_3$ and 8% $SiO_2$, exhibited a density approximating about 70 percent of the theoretical value. The modulus of rupture measured at room temperature was about 7,500 psi and at 1,100°C. was 7,000 psi. It will be appreciated that the density of the fired body could be increased by adding small percentages of mineralizers such as $TiO_2$, CaO, or $Fe_2O_3$ thereto, or by mixing more $Al_2O_3$ into the colloidal silica solution.

EXAMPLE II

A mixture composed of 1,000 cc. of the aforementioned colloidal silica solution containing 30% $SiO_2$, 100 cc. $NH_4OH$, and 37.5 cc. methyl formate was blended together to produce a homogeneous dispersion and 4,000 grams of $Al_2O_3$ having a particle size less than 43 microns stirred vigorously therein for about three minutes. The resulting suspension was poured into a plastic container wherein gelation occurred within about 6 minutes and a linear shrinkage of approximately 3 percent observed after about 1 hour.

Thereafter, the same drying and firing procedure was utilized as recited above in Example I to produce an essentially identical fired product.

EXAMPLE III 1,000 cc. of the colloidal silica solution referred to above containing 30% $SiO_2$, 100 cc. $NH_4OH$, and 4 cc. ethyl formate were mixed together for about 1 hour and 4000 grams $Al_2O_3$ having a particle size less than 43 microns added thereto with vigorous stirring. The slurry resulting therefrom was stirred for about 2 minutes and then poured into a plastic mould. Tapping and vibrating the mould acted to release trapped air bubbles to the surface. Gelation occurred in about four minutes with approximately 2 percent linear shrinkage of the gelled body being measured after about one hour.

The subsequent drying and firing practice was the same as recoreded in Example I and the fired article exhibited essentially identical physical properties thereto.

EXAMPLE IV

A suspension composed of 1,000 cc. of the above-described colloidal silica solution containing 30% $SiO_2$, 5000 grams ballmilled chrome ore (commercial Transvaal Chrome Ore having a particle size less than 260 microns), 100 cc. $NH_4OH$, and 70 grams of a commerical dispersing agent was stirred for one hour at room temperature. Thereafter, 10 cc. methyl formate and 10 cc. methyl acetate were added to the slurry, the combined mixture strongly agitated to insure homogeneous dispersion, and then transferred to a plastic container wherein gelation took place in about 4 minutes. Linear shrinkage of about 3 percent was observed after 1 hour.

The plastic container holding the gel was exposed to the ambient atmosphere for four days after which it was placed in an oven operating at 60°-70°C. for about 40 hours. Skrinkage during this drying approximated 8 percent linearly. The green strength of the body char- The firing schedule utilized was the same as that recited in Example I with the resultant overall shrinkage of the body being about 11 percent linearly. The fired body had the composition, by weight on the oxide basis, of 30% $Cr_2O_3$, 26% $Al_2O_3$, 19% MgO, 13.5% $Fe_2O_3$, 11% $SiO_2$, and 0.5% CaO with a density approximating 80 percent of the theoretical value. The body demonstrated a modulus of rupture of 5,200 psi at room temperature and this strength remained constant up to 1,200°C.

EXAMPLE V

To a mixture of 100 cc. $NH_4OH$ and 1,000 cc. of the colloidal silica solution referred to above containing 30% $SiO_2$, 4500 grams of a high zirconia, zirconia-alumina refractory composition having a particle size smaller than 43 microns were added. The resultant mixture was vigorously stirred for about 1 hour to obtain homogeneous mixing and wetting. Subsequently, 25 cc. methyl formate and 20 cc. methyl acetate were run into the mixture, strongly agitated for about five minutes, and the slurry poured into a plastic mould where gelation took place in about 7 minutes at room temperature.

The mould containing the gel was opened to the ambient atmosphere for 1 week and then transferred to an oven operating at 60°C. for 1 day. A linear shrinkage of about 8% was observed on the green body and the strength thereof was characterized by a modulus of rupture measurement of about 969 psi.

The green body was fired at 100°C./hour to 1,500°C., maintained thereat for 10 hours, and then cooled to room temperature at furnace rate. It will be appreciated that unstabilized zirconia compositions would require more elaborate heating and cooling schedules to produce a sound body, since compensation for the expansion characteristics of zirconia must be undertaken.

An overall linear shrinkage of about 13 percent was observed in the fired body with a density approximating 90 percent of the theoretical value. Modulus of rupture measurements of about 13,000 psi were obtained at room temperature which decreased to 6,000 psi at 1,200°C.

EXAMPLE VI

A suspension comprising 200 cc. of the above-described colloidal silica solution containing 30% $SiO_2$, 800 grams SiC having a particle size finer than 43 microns, 12 grams colloidal carbon black having a particle size smaller than 56 millimicrons, 20 cc. $NH_4OH$, 37 cc. $H_2O$, and 1 gram of a commercial dispersing agent was prepared and strongly agitated for one hour to secure uniform mixing and wetting. The carbon was included to convert the $SiO_2$ to SiC during firing. A mixture of 4 cc. methyl acetate and 4 cc. methyl formate was added to the slurry, the slurry stirred for about 10 minutes, and then transferred to a wax-coated steel mold.

Inasmuch as gelation did not begin immediately, the SiC tended to settle out. This situation was accommodated through the addition of another 400 grams SiC evenly distributed over the entire surface of the sample thereby absorbing the residual silica solution. The resultant body was thereafter pressed at 100 psi for 12 hours at room temperature and dried for three days at 60°C. No shrinkage was noticeable after this drying.

The pressed body was fired to 1,600°C. at 50°C./hour, maintained thereat for 8 hours, and cooled to room temperature at furnace rate. No substantial shrinkage was observed and the density of the body approximated 75 percent of the theoretical value. Modulus of rupture figures of about 4,000 psi were measured at room temperature and 7,200 psi at 1,300°C.

EXAMPLE VII

A suspension was prepared consisting of 100 cc. of the quaternary ammonium silicate solution referred to above and 300 grams SiC having a particle size finer than 43 microns and the mixture stirred for about 1 hour. To this suspension 4 cc. methyl acetate were added with stirring for about five minutes. The resultant slurry was poured into a plastic coated steel mould and 60 additional grams of the above SiC distributed over the surface thereof in like manner to that described in Example VI. The slurry gelled in about 60 minutes.

The subsequent drying and firing schedules were identical to those utilized in Example VI and the dried and fired products exhibited essentially similar physical properties thereto. The employment of the organic silicate as the bonding agent obviated the necessity for including carbon in the batch materials to convert $SiO_2$ to SiC.

EXAMPLE VIII

A suspension was prepared composed of 100 cc. of the abovedescribed lithium silicate solution and 350 grams petalite having a particle size finer than 74 microns. After agitating the suspension for about 1 hour, 8 cc. methyl acetate were added, and the resultant mixture stirred for about 2 minutes. Thereafter, the mixture was poured into a plastic container wherein gelation took place in about 30 minutes.

The plastic container with the sample was then placed in an oven operating at 60°C. and the sample dried in air for 3 days. Shrinkage during this drying averaged about 7 percent linearly and modulus of rupture measurements undertaken on the body indicated a mechanical strength of about 277 psi.

The dried body was heated at 100°C./hour to 1,125°C., maintained thereat for 8 hours, and cooled to room temperature at furnace rate. Shrinkage during the firing step was measured at about 7 percent linearly, thereby providing an overall shrinkage of about 14 percent. The density of the dried body was determined to be about 90 percent of the theoretical value. Modulus of rupture tests conducted at room temperature averaged 5,700 psi.

EXAMPLE IX

A suspension was prepared composed of 85 grams of the lithium silicate solution referred to above and 175 grams petalite having a particle size smaller than 74 microns. After stirring the suspension for about 1 hour, 7.5 grams glyoxal were added thereto. The slurry was then poured into a plastic mould where gelation occurred within about 2 minutes.

Thereafter, the mould containing the gel was first placed in an oven operating at 75°C. for 12 hours, then removed from the oven and dried at room temperature for 1 day, and, finally, returned to the oven at 75°C. and dried for another day.

The dried body was heated in an oxidizing atmosphere at 25°C./hour to 450°C., maintained thereat for about eight hours, the temperature raised at 100°C./hour to 1,125°C., held thereat for 8 hours, and then cooled to room temperature at furnace rate.

Overall shrinkage of the body aftr firing was about 7 percent linearly and the density of the fired body was determined to be about 1.6 grams/cm³.

EXAMPLE X

The refractory oxide, MgO, could not be successfully dispersed in colloidal silica solutions since instantaneous gelation of the silica occurred. Nevertheless, it was discovered that a reasonably slow and uniform gelation of silica could be had when MgO was first sintered or fused with some relatively inert material, the term "inert" referring to the essential absence of a reaction between said material and the silicate to cause gelation. Those relatively inert materials include such common refractory oxides as $Al_2O_3$, $Cr_2O_3$, and $ZrO_2$; the very rare earth metal oxides such as $La_2O_3$, $CeO_2$, and $EuO_2$; the very highly refractory metal oxides such as $MoO_3$, $Ta_2O_5$, and $WO_3$; and various mineral compositions such as petalite, lepidolite, and spodumene. Generally, no gelation agent other than MgO will be required to polymerize the silica, but additions thereof can be useful in shortening the setting time required. Therefore, the preferred practice contemplates a combination composed of the MgO product and one of the organic gelation agents.

Hence, equimolar quantities of powdered $Al_2O_3$ and MgO were blended together and fired at 1,500°C. for four hours yielding a reaction product of spinel (MgO·$Al_2O_3$). This spinel was broken up and ballmilled for 8 hours after which 350 grams of the ballmilled powder were dispersed in 100 cc. $H_2O$ and 100 cc. of the above-described colloidal silica solution containing 30% $SiO_2$. After stirring the resultant slurry for about 30 minutes, the viscosity thereof increased significantly and it was poured into a plastic mould.

The subsequent drying and firing schedules employed were the same as those utilized in Example I. Shrinkage after air drying was about 10 percent linearly. Shrinkage after firing was about 27 percent linearly, the density of the body was found to be about 99 percent of the theoretical value, and the modulus of rupture at room temperature averaged about 18,000 psi. Analysis of the fired body indicated an approximate composition, by weight on the oxide basis, of about 28% MgO, 65% $Al_2O_3$, and 8% $SiO_2$.

EXAMPLE XI

Powdered MgO was mixed with powder of a high zirconia, zirconia-alumina refractory composition in such proportions to yield 15% MgO and 85 percent of the refractory composition. The mixture was fired at 1,500°C. for 4 hours and the reaction product broken up and ballmilled for eight hours. A slurry was then prepared consisting of 4,320 grams of the ballmilled powder, 500 cc. $H_2O$, 100 ml. $NH_4OH$, and 500 cc. of the aforementioned colloidal silica solution containing 30% $SiO_2$ and stirred for about one hour. To expedite polymerization of the $SiO_2$, 10 cc. methyl formate was stirred into the slurry and gelation took place in about 3 minutes.

The forming, drying, and firing practices recited in Example IX were thereafter followed. Shrinkage after drying was about 10 percent linearly and the dried body exhibited a modulus of rupture of about 330 psi. Shrinkage after firing was about 14 percent, resulting in a total overall value of about 24 percent. The density of the fired body approximated 96 percent of the theoretical and the modulus of rupture at room temperature averaged about 6000 psi.

EXAMPLE XII

An intimate mixture was prepared by kneading 800 grams powdered wollastonite, 300 grams wood shavings, 150 cc. $NH_4OH$, 60 cc. methyl acetate, and 1,500 cc. of the above-described colloidal silica solution containing 40% $SiO_2$ for about 30 minutes. The mixture was transferred to a plastic coated steel mould and pressed at 100 psi for 4 hours at 80°C. during which time the silica polymerized. The pressed body was then placed in an oven operating at 60°C. and heated in air for 8 hours to eliminate moisture therefrom.

The dried body exhibited density of 0.87 g/cc. and was composed of, by weight, 42 percent wollastonite, 42% $SiO_2$, and 16% wood shavings. Although the quantity of wood shavings is small, the composite displays the appearance and texture of the shavings. However, the body is fireproof to a high degree because of the high percentage of inorganic material incorporated therein.

EXAMPLE XIII

A suspension was prepared composed of 300 grams powdered wollastonite, 100 cc. formamide, and 1,000 cc. of the potassium silicate solution referred to above. To this suspension was added 500 grams sawdust and the mixture kneaded for about 30 minutes to obtain a uniform consistency therein.

Thereafter, the mixture was formed and dried in the manner recited in Example XII. The density of the final product was 0.76 g/cc.

EXAMPLE XIV

A slurry was prepared from 16 grams paraformaldehyde and 150 cc. of the above-described sodium silicate solution. Thereafter, 100 grams asbestos fibers were added thereto and the mixture kneaded for about 20 minutes to secure a uniform consistency therein.

The mixture was then pressed and dried in accordance with the procedure described in Example XII. The final product exhibited a density of 0.94 g/cc.

EXAMPLE XV

To a mixture composed of 75 cc. of the aforementioned potassium silicate solution, 10 cc. ethyl acetate, and 75 cc. of the above-described colloidal silica solution containing 40% $SiO_2$, 200 grams wollastonite powder were added and the mixture kneaded for about one hour to insure uniform consistency therein.

Subsequently, the mixture was pressed and dried in like manner to the practice of Example XII and yielded a product having a density of 1.79 g/cc. and a composition, in weight percent, of 79 percent wollastonite, 18% $SiO_2$, and 3% $K_2O$.

Apart from employing soluble silicates and/or colloidal silica as the binding agents, it will be recognized that suspension of silica, silica-containing materials, and silicate glass powders which release soluble silica species into aqueous solutions are appropriate starting materials for integrally bonding essentially inert filler particles and fibers. One simple method for incorporating silica in an aqueous solution involves ballmilling silica-containing powders in water. The utility of this technique in the instant invention is demonstrated in the following example:

EXAMPLE XVI

Fused silica powder was prepared by fusing quartz sand in any of the conventional methods. 2,500 grams of this powder were ballmilled with 1,000 ml. $H_2O$ for 100 hours at room temperature. This mechanical agitation and milling was sufficient to produce a colloidal solution of the glass in water. With vigorous stirring, 100 cc. $NH_4OH$ and 40 cc. methyl formate were added and the mixture transferred to a plastic container where gelation occurred in about two minutes. Thereafter, the gel was exposed to the ambient atmosphere at room temperature for two days followed by drying for 24 hours in an oven operating at 70°C. The air dried body could then be fired to a glass article. Relatively thin shapes (about 5 mm. thickness) have been fired to transparent articles of fused silica in a gas-oxygen flame.

The use of the forming technique of this invention to obtain high-$SiO_2$ articles proves to be especially desirable in the production of such shapes as large dimension tubing where the manufacture thereof from fused silica by conventional methods becomes extremely expensive.

Inasmuch as glass powders containing alkali metal oxides and/or other oxides can have a higher solubility in water than the above-described fused silica, it is apparent that such glasses would require less milling to achieve a true or colloidal aqueous solution thereof. And, it can readily be appreciated that these solutions, as well as that secured from powdered fused silica, could be mixed with the same kinds of inert fillers which have been discussed above and provide strong bonds for ceramic articles and composites of fibrous and/or porous materials.

We claim:

1. A method for making bodies exhibiting high green strength consisting essentially of a gelled silicate bond and filler materials consisting of inorganic and/or organic particulate and/or fibrous and/or porous materials comprising the steps of:

a. mixing said filler materials with about 3–75 percent by weight total of an aqueous silicate solution and a gelation agent, said aqueous silicate solution being a true solution, colloidal solution, and/or suspension selected from the group consisting of powdered glasses of fused silica or alkali metal silicates, alkali metal silicates selected from the group consisting of lithium silicate, sodium silicate and/or potassium silicate, an organic ammonium silicate, colloidal silica, and mixtures thereof containing about 1–12 moles of $SiO_2$/liter in solution and/or colloidal solution and having a pH of about 10–15, and said gelation agent being selected from the group consisting of MgO fused or sintered with a material selected from the group consisting of $Al_2O_3$, $Cr_2O_3$, $ZrO_2$, $La_2O_3$, $CeO_2$, $EuO_2$, $MoO_3$, $Ta_2O_5$, $WO_3$, petalite, lepidolite, spodumene, and mixtures thereof and/or an organic compound selected from the group consisting of formaldehyde, paraformaldehyde, methyl formate, ethyl formate, methyl acetate, ethyl acetate, and mixtures thereof, the concentration of said formaldehyde and/or paraformaldehyde being such that the mole ratio of the organic compound to the alkali metal oxide and/or ammonium ion present in the solution ranges between about 2–13 and the concentration of said methyl formate, ethyl formate, methyl acetate, and/or ethyl acetate being between about 2–20 percent by volume;

b. forming said mixture into a body of a desired shape; and c. reacting said gelation agent with said aqueous silicate solution at a temperature between the freezing point and the boiling point of the solution in an amount and for a sufficient length of time to reduce the pH to between about 7–10 to polymerize the $SiO_2$ and thereby bond said filler materials.

2. A method according to claim 1 wherein said true solution, colloidal solution, and/or suspension contains about 3–12 moles of $SiO_2$/liter in solution.

3. A method according to claim 1 wherein said organic ammonium silicate is a quaternary ammonium silicate.

4. A method according to claim 1 wherein the reaction temperature ranges between about room temperature and 180°C.

5. A method according to claim 1 wherein the time sufficient to reduce the pH to between about 7–10 to polymerize the $SiO_2$ ranges between about 1 minute to 24 hours.

6. A method according to claim 1 wherein $SiO_2$ will be introduced by said aqueous silicate solution into said bodies in amounts between about 1–25 percent by weight based upon the total amount of said filler materials and silica.

* * * * *

UNITED STATES PATENT OFFICE
CERTIFICATE OF CORRECTION

Patent No. 3,804,650     Dated April 16, 1974

Inventor(s) Helmuth E. Meissner, Francis L. Orso, Timothy E. Pierce and Janice L. Stiles It is certified that error appears in the above-identified patent and that said Letters Patent are hereby corrected as shown below:

Column 4, line 52, "(>53 microns)" should be -- (<53 microns) --.

Column 7, line 66, after "body" insert -- was --.

Column 10, line 21, "very" should be -- exotic --.

Column 12, line 12, "was" should be -- were --.

Column 14, Claim 4, "180°C." should be -- 100°C. --.

Signed and sealed this 1st day of October 1974.

(SEAL)
Attest:

McCOY M. GIBSON JR.
Attesting Officer

C. MARSHALL DANN
Commissioner of Patents